United States Patent Office 3,345,362
Patented Oct. 3, 1967

3,345,362
NOVEL PREGNENOLONE ACETONIDES
Richard T. Rapala, Indianapolis, Ind., assignor to Eli Lilly and Company, Indianapolis, Ind., a corporation of Indiana
No Drawing. Filed July 27, 1961, Ser. No. 127,115
1 Claim. (Cl. 260—239.55)

This invention relates to novel steroids. In particular, this invention relates to novel, orally active pregnenolone progestational agents and to the novel pregnenolone intermediates utilized in their manufacture.

At present, progestational agents in orally effective form are prepared by activating a suitable steroid molecule with one of two groups. One method involves the preparation of the 17α-ethynyl derivative of a testosterone analog, and the other procedure is to attach the 17α-acetoxy substituent to a progestin which is known to be active upon injection. The resulting compounds are, in general, orally effective as progestational agents. In each case the compounds also posses a $\Delta^4$-3-keto grouping. This grouping and the above substituents, until now, have been obligatory for oral progestational activity.

An object of this invention is to provide novel oral progestational agents which are rendered orally active by an entirely different substituent and, furthermore, incorporate a different grouping in the A and B rings than the $\Delta^4$-3-keto system. Another object is to provide novel pregnenolone intermediates utilized in the preparation of the progestational agents of this invention.

These and other objects of this invention are accomplished by providing, as a new composition of matter, a progestational agent which comprises a 16α-17α-isopropylidenedioxypregnenolone. A particularly preferred embodiment of this invention comprises novel pregnenolones of the following general formula (wherein R is hydrogen or a methyl group).

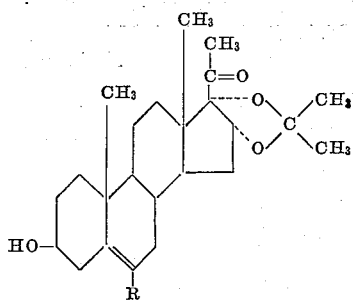

These latter compounds possess progestational activity equal to or greater than 17α-acetoxy progesterone and 17-ethynyl-19-nortestosterone, a most unusual fact, since the A and B rings of the new compounds contain the $\Delta^5$-3-β-ol group—a structural type not heretofore associated with hormonal action.

The 16α,17α-isopropylidenedioxypregnenolones of this invention are easily derived in two steps from a commercially available $\Delta^{16}$-pregnenolone. The preparation generally involves oxidation of a $\Delta^{16}$-pregnenolone to form a 16α,17α-dihydroxypregnenolone, which comprises the novel pregnenolone intermediate of this invention. This intermediate is then converted to the cyclic ketal, i.e., a 16α,17α-isopropylidenedioxypregnenolone, by reaction with acetone and acid. The 16α,17α-dihydroxypregnenolone and the 16α,17α-dihydroxy-6-methylpregnenolone are preferred intermediates since they readily form, upon reaction with acetone under acidic conditions, the preferred 16α,17α-isopropylidenedioxypregnenolone and the 16α - 17α - isopropylidenedioxy - 6 - methylpregnenolone progestational agents of this invention. The following illustrative reaction sequence (wherein R is hydrogen or a methyl group) demonstrates the preparation of the novel 16α,17α-pregnenolones of this invention:

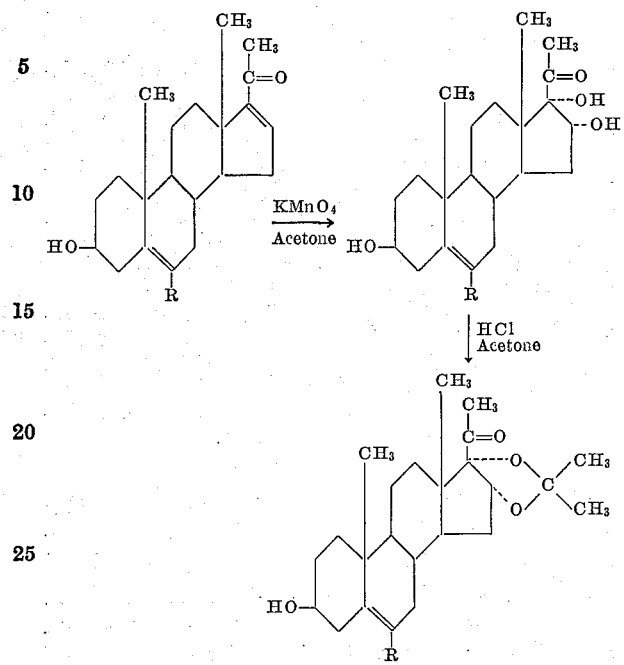

From the above it can be seen that the novel pregnenolones of this invention can be prepared with ease from cheap, readily available starting materials. This fact, naturally, is of particular significance in steroid chemistry, which generally involves highly complicated and expensive technology, since it means that the desired steroid medicinal can be marketed at a lower price. This is important in the case of the novel pregnenolones of this invention, since these compounds have a variety of therapeutic applications. For example, the 16α,17α-isopropylidenedioxypregnenolones of this invention, in addition to being excellent progestational agents, also possess anti-inflamatory activity as well as diuretic action. Likewise, the novel 16α,17α-dihydroxypregnenolone intermediates of this invention, not only are excellent chemical intermediates in the synthesis of cyclic ketals and acetals, but also have glucocorticoidal and other biological properties.

The follownig examples more fully demonstrate this invention—particularly with respect to the ease and simplicity of the preparation of the novel pregnenolones thereof.

*Example 1*

This example demonstrates a two-step preparation of 16α,17α-isopropylidenedioxy-6-methylpregnenolone from commercially available 6-methyl-$\Delta^{16}$-pregnenolone. The process proceeds through the novel intermediate, 16α,17α-dihydroxy-6-methylpregnenolone.

To a reaction vessel provided with means for cooling and stirring was added 1.0 g. of 6-methyl-$\Delta^{16}$-pregnenolone dissolved in 25 cc. acetone. To this mixture was added 0.25 cc. acetic acid and the resulting solution was cooled in ice, while stirring. Thereafter, a solution of 0.410 g. potassium permanganate in 5 cc. of 85 percent acetone, was added in about one and one-half minutes. The color discharged rapidly. To this mixture was then added sodium bisulfite solution, until the color had completely discharged, after which acetone was added. The resulting mixture was filtered, the filter cake washed with acetone, and the combined filtrate and washings evaporated to a lower volume in vacuo to remove the excess solvent. Water was added as a precipitation aid and, upon further evaporation, a precipitate was produced. The precipitate was cooled, filtered, and recrystallized from aqueous acetone. The crude 16α,17α-dihydroxy-6-methylpregnenolone thus prepared melted at about 138–152° C. and weighed 650 mg. The ultraviolet spectrum of an ethanolic solution of this compound showed only about a maximum of 10 percent of the 6-methyl-Δ$^{16}$-pregnenolone starting material remaining.

To 200 mg. of the above-prepared crystalline 16α,17α-dihydroxy-6-methylpregnenolone was added 12 cc. acetone and three drops of concentrated hydrochloric acid. The mixture was maintained at room temperature for about 14 hours, whereupon the desired product, 16α,17α-isopropylidenedioxy - 6 - methylpregnenolone, separated. The resulting slurry was cooled to about 0° C. and filtered. Sixty mg. of product were obtained, melting at 248–251° C. This material had no ultraviolet absorption maxima corresponding to the 20 ketone, Δ$^{16}$ unsaturated system, and the infrared spectrum was consistent with the 16α,17α-isopropylidenedioxypregnenolone structure. The carbon-hydrogen analysis for $C_{25}H_{38}O_4$ is: C=74.59, H=9.52. Found, C=74.35, H=9.75. These analytical data clearly substantiate that the product produced was 16α,17α-isopropylidenedioxy-6-methylpregnenolone.

*Example II*

The preparation of 16α,17α-dihydroxypregnenolone and the conversion of this intermediate to 16α,17α-isopropylidenedioxypregnenolone are demonstrated by the following examples.

To a reaction vessel provided with means for cooling and stirring was added 1.0 g. of Δ$^{16}$-pregnenolone, dissolved in 45 cc. acetone. To this solution was added 0.25 cc. acetic acid and the resulting solution was cooled in ice while stirring. Thereafter, a solution of 0.410 g. of potassium permanganate in 5 cc. of 85 percent acetone was added in four portions over a period of two minutes. The reaction mixture was allowed to react for an additional one and one-half minutes, and sodium bisulfite solution was thereafter added in sufficient amount to discharge the color of the reaction mixture. The mixture was then filtered and the filtered residue washed with acetone. The filtrate and washings were combined, diluted with water, evaporated in vacuo, and cooled in ice, whereupon a solid precipitate was deposited. After filtration, this precipitate was washed with water and dried in vacuo. The crude 16α,17α-dihydroxypregnenolone thus prepared melted at 155–177° C. and weighed 660 mg. The ultraviolet spectrum of an ethanolic solution of this material showed only about a maximum of 15 percent of the Δ$^{16}$-pregnenolone remaining. Pure 16α,17α-dihydroxypregnenolone was prepared by recrystallizing the above material from acetone.

To 200 mg. of the above-prepared, purified 16α,17α-dihydroxypregnenolone were added 12 cc. acetone and four drops of concentrated hydrochloric acid. All the material went into solution after about 19 hours at room temperature. The solution was then coled to about 0° C. and water was added dropwise. The mixture was allowed to remain at 0° C. for about one hour, and the precipitated material was then filtered. The precipitate, 16α,17α-isopropylidenedioxypregnenolone, was washed and then vacuum dried. The material thus obtained weighed 120 mg. and melted at 193–200° C. There was no ultraviolet-absorbing impurity present, and the infrared spectrum was consistent with the 16α,17α-isopropylidenedioxypregnenolone structure.

For convenience, the compounds of this invention have been named as pregnenolone derivatives; that is, derivatives of 3β-hydroxy-5-pregnen-20-one. However, 16α,17α-dihydroxypregnenolone could also be named 3β-16α,17α-trihydroxy-5-pregnen-20-one, and 16α,17α-isopropylidenedioxy-6-methylpregnenolone could be called 16α,17α-isopropylidenedioxy - 6 - methyl - 3β - hydroxy - 5 - pregnen-20-one.

I claim:

16α,17α-isopropylidenedioxy-6-methylpregnenolone.

References Cited

UNITED STATES PATENTS

| | | | |
|---|---|---|---|
| 2,727,909 | 12/1955 | Colton | 260—397.4 |
| 2,941,997 | 6/1960 | Fried | 260—239.55 |
| 3,021,345 | 2/1962 | Feather et al. | 260—397.4 |

ELBERT L. ROBERTS, *Primary Examiner.*

L. GOTTS, M. LIEBMAN, E. ROBERTS, G. E. LANDE,
*Assistant Examiners.*